United States Patent
Ip et al.

(10) Patent No.: US 11,566,937 B2
(45) Date of Patent: Jan. 31, 2023

(54) RAYLEIGH FADING MITIGATION VIA SHORT PULSE COHERENT DISTRIBUTED ACOUSTIC SENSING WITH MULTI-LOCATION BEATING-TERM COMBINATION

(71) Applicant: NEC Laboratories America, Inc., Princeton, NJ (US)

(72) Inventors: Ezra Ip, West Windsor, NJ (US); Yue-Kai Huang, Princeton, NJ (US); Junqiang Hu, Davis, CA (US); Shuji Murakami, Monmouth Junction, NJ (US)

(73) Assignee: NEC Corporation

( * ) Notice: Subject to any disclaimer, the term of this patent is extended or adjusted under 35 U.S.C. 154(b) by 289 days.

(21) Appl. No.: 16/879,505

(22) Filed: May 20, 2020

(65) Prior Publication Data
US 2020/0370950 A1    Nov. 26, 2020

Related U.S. Application Data

(60) Provisional application No. 62/851,160, filed on May 22, 2019.

(51) Int. Cl.
*G01H 9/00* (2006.01)
*G01B 9/02015* (2022.01)
(Continued)

(52) U.S. Cl.
CPC ......... *G01H 9/004* (2013.01); *G01B 9/02015* (2013.01); *G01B 9/02092* (2013.01); *G01D 5/35361* (2013.01); *G01V 1/181* (2013.01)

(58) Field of Classification Search
CPC ............... G01H 9/004; G01B 9/02015; G01B 9/02092; G01B 11/18; G01V 1/181; G01V 1/20; G01D 5/35361; G01D 5/35329
See application file for complete search history.

(56) References Cited

U.S. PATENT DOCUMENTS

| | | | |
|---|---|---|---|
| 2015/0114127 A1* | 4/2015 | Barfoot | G01H 9/004 73/655 |
| 2017/0090054 A1* | 3/2017 | Willis | G01V 1/42 |

(Continued)

OTHER PUBLICATIONS

Kazuro Kikuchi, Fundamentals of Coherent Optical Fiber Communications, 2015, Journal of Lightwave Technology, vol. 34, No. 1, pp. 157-179 (Year: 2015).*

(Continued)

*Primary Examiner* — Michael P LaPage
(74) *Attorney, Agent, or Firm* — Joseph Kolodka

(57) ABSTRACT

Aspects of the present disclosure describe Rayleigh fading mitigation via short pulse coherent distributed acoustic sensing with multi-location beating-term combination. In illustrative configurations, systems, methods, and structures according to the present disclosure employ a two stage modulation arrangement providing short interrogator pulses resulting in a greater number of sensing data points and reduced effective sectional length. The increased number of data points are used to mitigate Rayleigh fading via a spatial combining process, multi-location-beating combining (MLBC) which uses weighted complex-valued DAS beating results from neighboring locations and aligns phase signals of each of the locations, before combining them to produce a final DAS phase measurement. Since Rayleigh scattering is a random statistic, the MLBC process allows capture of different statics from neighboring locations with correlated vibration/acoustic signal. The combined DAS results minimize a total Rayleigh fade, in both dynamic fading and static fading scenarios.

2 Claims, 9 Drawing Sheets

(51) Int. Cl.
    *G01B 9/02*     (2022.01)
    *G01D 5/353*     (2006.01)
    *G01V 1/18*     (2006.01)

(56) References Cited

U.S. PATENT DOCUMENTS

| | | | |
|---|---|---|---|
| 2017/0222729 A1 | 8/2017 | Sadot et al. | |
| 2017/0331559 A1* | 11/2017 | Matsushita | G02F 1/2255 |
| 2017/0350734 A1 | 12/2017 | Ji et al. | |
| 2018/0058196 A1* | 3/2018 | Jaaskelainen | E21B 47/135 |
| 2018/0238732 A1 | 8/2018 | Suh | |
| 2019/0211671 A1* | 7/2019 | Skinner | G01V 1/226 |
| 2020/0158543 A1* | 5/2020 | Koste | G01D 5/35358 |
| 2020/0249075 A1* | 8/2020 | Ma | G02B 26/04 |
| 2022/0049979 A1* | 2/2022 | Stern | G01K 11/322 |

OTHER PUBLICATIONS

Andreas Leven, Coherent Receivers for Practical Optical Communication Systems, 2009, Fiber Optics Communications, pp. 1-3 (Year: 2009).*

* cited by examiner

RAYLEIGH FADING MITIGATION VIA SHORT PULSE COHERENT DISTRIBUTED ACOUSTIC SENSING WITH MULTI-LOCATION BEATING-TERM COMBINATION

CROSS REFERENCE

This disclosure claims the benefit of U.S. Provisional Patent Application Ser. No. 62/851,160 filed May 22, 2019 the entire contents of which is incorporated by reference as if set forth at length herein.

TECHNICAL FIELD

This disclosure relates generally to distributed acoustic sensing systems, methods, and structures. More particularly, it describes Rayleigh fading mitigation in acoustic sensing systems, methods, and structures via short pulse coherent distributed acoustic sensing with multi-location beating-term combination.

BACKGROUND

Distributed acoustic sensing (DAS) systems and methods employ Rayleigh scattering effects in optical fiber to detect changes in the fiber strain. Obtained dynamic strain signal(s) are used to detect vibration and acoustic signal(s) along the length of the optical fiber (cable) under interrogation along with its location information. Given such utility, DAS has found widespread applicability in oil and gas exploration and operation, infrastructure monitoring, and environmental monitoring—including earthquake detection—among others.

A noted problem with DAS is that Rayleigh scattering is a random effect in optical fiber and signal detection is susceptible to fading. Therefore—for DAS systems relying on detection of Rayleigh scattered signals—there is a possibility that at certain locations the scattered signal strength will fade and inundated by noise. Such fading and/or noise will cause instability in phase measurement and create "blind spots" at those certain locations in a relatively quiet environment (static fading). In environments where large vibrations are common occurrences, i.e., aerial cable/fence installations, the vibration signal itself may cause the DAS signal to fade to levels near or below the noise level—thus creating phase measurement instabilities at these time instances (dynamic fading).

SUMMARY

The above problem is solved and an advance in the art is made according to aspects of the present disclosure directed to Rayleigh fading mitigation via short pulse coherent distributed acoustic sensing with multi-location beating-term combination.

In sharp contrast to the prior art—systems, methods, and structures according to aspects of the present disclosure achieve Rayleigh fading mitigation by employing short interrogation pulse(s). In further contrast to the prior art, the short interrogation pulse(s) according to aspects of the present disclosure are generated through the effect of a cascaded modulator advantageously implemented in two stages. A first stage having a low cost telecommunications grade intensity modulator and a second stage having a modulator such as SOA or AOM which achieves a sufficiently high extinction ratio required for fiber sensing application(s).

In illustrative configurations, systems, methods, and structures according to the present disclosure, the short interrogator pulses result in a greater number of sensing data points and reduced effective sectional length. The increased number of data points are used to mitigate Rayleigh fading via a spatial combining process, multi-location-beating combining (MLBC) which uses weighted complex-valued DAS beating results from neighboring locations and aligns phase signals of each of the locations, before combining them to produce a final DAS phase measurement. Since Rayleigh scattering is a random statistic, the MLBC process allows capture of different statics from neighboring locations with correlated vibration/acoustic signal. The combined DAS results minimize a total Rayleigh fade, in both dynamic fading and static fading scenarios.

BRIEF DESCRIPTION OF THE DRAWING

A more complete understanding of the present disclosure may be realized by reference to the accompanying drawing in which:

FIG. 4(A), FIG. 4(B), FIG. 4(C), and FIG. 4(D) are a series of plots illustrating DAS measurement results for: FIG. 4(A), FIG. 4(B)—40 ns pulse width; and FIG. 4(C), FIG. 4(D), 4 ns pulse width, according to aspects of the present disclosure; FIG. 5(A) DAS measurement results on aerial cable attached to a telephone pole; and FIG. 5(B) 3D accelerometer measurements on the same telephone pole according to aspects of the present disclosure.

Figure 1:
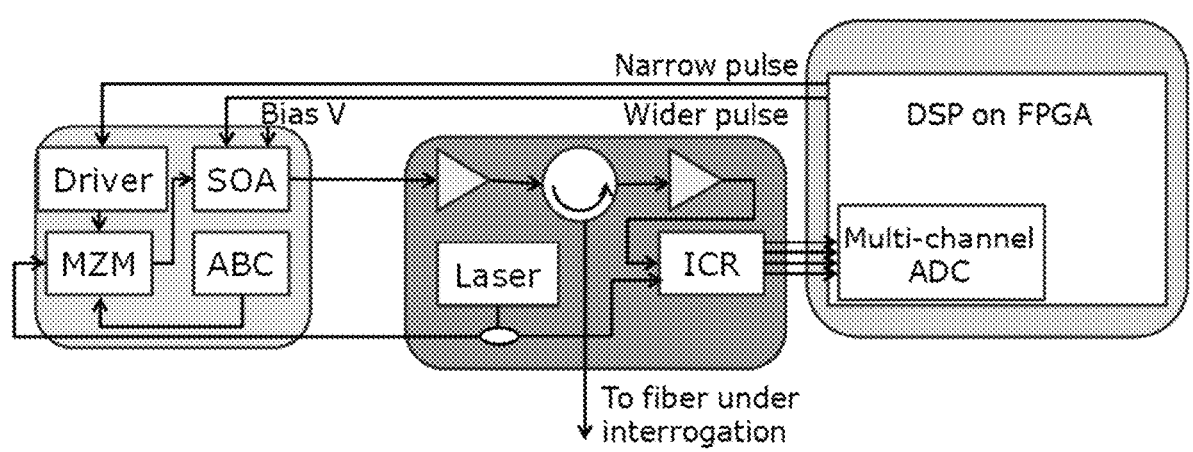
FIG. 1 shows a schematic diagram of an illustrative architecture for short pulse coherent DAS for Rayleigh fade mitigation according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we note that a common and somewhat effective way of mitigating the Rayleigh fading effect in DAS is to interrogate the fiber using different frequencies of light. As such, several prior art approaches have reported improved DAS performances by monitoring multiple frequency/wavelength channels in static fading environments. In one approach, a three frequency DAS system was demonstrated using an acoustic-optic modulator (AOM) ring plus filter to extract the generated frequencies for DAS interrogation (See, e.g., A. Hartog, L. B. Liokumovich, N. A. Ushakov, O. I. Kotov, T. Dean, T. Cuny, & A. Constantinou, "The Use of Multi-frequency Acquisition to Significantly Improve the Quality of Fibre-optic Distributed Vibration Sensing," Tu P4 08, 78th EAGE Conference & Exhibition 2016, Vienna, Austria, May 2016, and US Patent Application Publication, 2013/0113629 A1: Hartog et al., "PHASE SENSITIVE COHERENT OTDR WITH MULTI-FREQUENCY INTERROGATION," May 9, 2013).

In another approach, multiple laser sources combined with optical switches were used to create interrogation pulses at multiple frequencies for purpose of Rayleigh fading mitigation, (See, e.g., US 20120297883A1: Vladimir Kupershmidt, "Pulse Labeling for High-Bandwidth Fiber-Optic Distributed Acoustic Sensing with Reduced Cross-Talk."

Finally, in yet another approach, the described DAS embodiment employs both multiple laser sources and the AOM loops to create the multi-wavelength interrogation pulses. However, the cost and complexity of implementing multiple frequencies/wavelengths DAS are not easily scalable, because the additional hardware and DSP resources needed to implement the parallel channel operation. (See, e.g., US Patent Application Publication No. 2008/0144016 A1: Lewis et al., "METHOD AND APPARATUS FOR ACOUSTIC SENSING USING MULTIPLE OPTICAL PULSES," June 2008).

These shortcomings in the art with respect to the mitigation of Rayleigh scattering and its effect on DAS are advantageously overcome by systems, methods, and structures according to the present invention—which employ short(er) interrogation pulses to produce our Rayleigh scattering mitigation effect.

We note that while it may be known that pulse width(s) of DAS interrogation pulses dictate the spatial resolution of the DAS system, its effect on Rayleigh scatter and subsequent fading as applied to DAS were unknown prior to the present disclosure. As we shall show and describe, there are at least two surprising benefits realized from using a shorter optical pulse(s) to mitigating Rayleigh fading.

In addition to the actual Rayleigh fade mitigation, short pulses require a shorter effective section length in fiber which the pulses occupy. In Rayleigh-based sensing system, the effective sectional length influences the accumulated pulse self-interferences—which effect is employed in intensity-based Rayleigh sensing systems (DVS). More specifically, the longer the effective fiber section, the more accumulated self-interferences that pulses will experience. In a large vibration environment, these self-interferences will contribute to dynamic Rayleigh fading and degrade DAS phase measurement stability. Using shorter optical pulses alleviates this dynamic fading effect.

A second advantage resulting from a shorter interrogation pulse is that—for the same fiber length—a DAS system will acquire more sensing data points because of the reduced effective sectional length. The increased data points, however, are not used to increase spatial resolution but to mitigate Rayleigh fading via a spatial combining process according to aspects of the present disclosure. This process, called multi-location beating combining (MLBC), uses weighted complex-valued DAS beating results from neighboring locations and aligns the phase signals of each locations, before combining them to produce the final DAS phase measurement. Since Rayleigh scattering is a random statistic, the MLBC process allows systems, methods, and structures according to aspects of the present disclosure to capture different statistics from the neighboring locations with correlated vibration/acoustic signal. This combined DAS advantageously minimizes the chance of a total Rayleigh fade, in both dynamic fading and static fading scenarios.

As we shall show further—for short optical pulse generation—systems, methods, and structures according to aspects of the present disclosure may advantageously employ a cascaded modulator. In an illustrative embodiment, a low-cost telecom grade intensity modulator is used for a $1^{st}$ stage of the cascade while a $2^{nd}$ stage modulator such as a semiconductor optical amplifier (SOA) or an acousto-optic modulator (AOM) advantageously achieves a high extinction ratio needed for fiber sensing applications. Such inventive cascaded arrangement only imposes a modest overhead in additional hardware as compared to traditional DAS systems employing wider optical pulses.

With reference now to FIG. 1 there is shown a schematic diagram of an illustrative architecture for short pulse coherent DAS for Rayleigh fade mitigation according to aspects of the present disclosure. As may be observed—a narrow linewidth (1~10 kHz) laser is used as a source of interrogating pulse(s) and a source of receiver local oscillator (LO). To generate short optical pulses for DAS interrogation according to aspects of the present disclosure, a 10G telecom grade lithium-niobate based Mach-Zehnder modulator (MZM) is used to modulate the continuous wavelength (CW) laser output signal with a bias voltage set at minimum transmittance, using an automatic bias controller (ABC).

Unfortunately, however, at typical commercial MZM exhibits an extinction ratio (ER) limit of ~35 dB, which is not enough for fiber sensing applications. We have advantageously overcome this infirmity—according to a further aspect of the present disclosure—by employing what we call a cascaded pulse modulation scheme to increase the ER using a wider pulse carving window which allows simpler time alignment between stages.

The $2^{nd}$ stage modulator can either be an acoustic-optical modulator (AOM), a semiconductor optical amplifier (SOA) switch, or another MZM if ER requirement is not high. We note that it is possible to use just one SOA switch to generate short optical pulses, however, the resulting pulses will exhibit a frequency chirp which will require additional hardware and DSP to compensate. Using our cascaded modulation approach, we achieve greater than 10× faster pulse generation and 20 dB better ER than traditional DAS.

In our illustrative demonstration prototype, an SOA switch was used as the $2^{nd}$ stage instead of AOM, because SOA does not exhibit intrinsic modulation frequency shift. This is important because the receiver ADC bandwidth is limited, and pulse modulation without shifting the center optical frequency allows the narrowest pulse generation possible—if full DAS signal spectrum is to be detected.

Note that the generated pulse width of $\Delta t$ and repetition rate of $R_{period}$ correspond to the raw spatial resolution $(c/2n \times \Delta t)$ and the sampling speed of the DAS interrogator. After amplification, the pulses are sent to the fiber for interrogation, with the Rayleigh reflected signal directed to an integrated coherent receiver (ICR) via an optical circulator.

Figure 2:
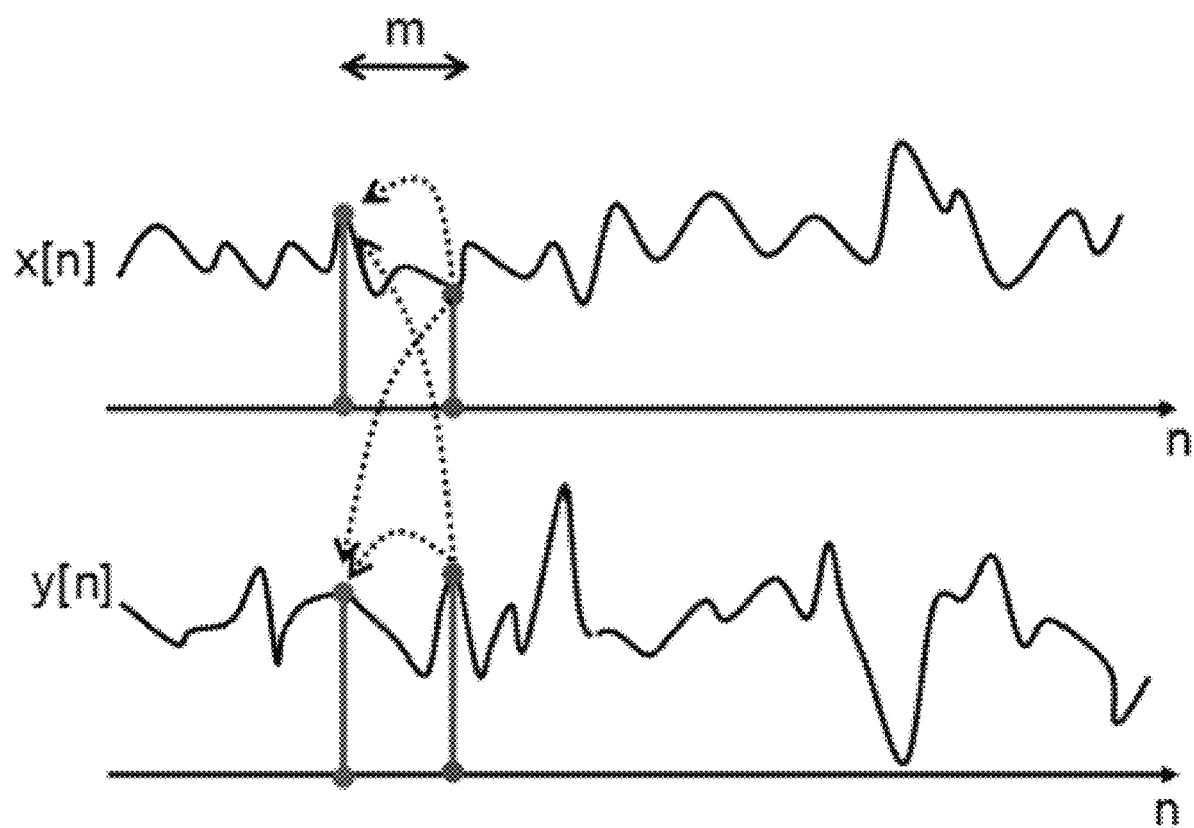
FIG. 2 shows a pair of plots illustrating the determination of four differential beat product terms from complex-valued x[n] and y[n] according to aspects of the present disclosure.

The initial portion of DSP as employed in systems, methods, and structures according to aspects of the present disclosure is like our original coherent DAS design, wherein dynamic fiber strain is calculated. Operationally, the strain is computed by using the beat products between complex-valued Rayleigh reflected signals at two separate locations. As shown in FIG. 2 shows a pair of plots illustrating the determination of four differential beat product terms from complex-valued x[n] and y[n] according to aspects of the present disclosure, the beat products between two complex value samples, separated by m samples, are used to determine the accumulated strain along the fiber section. More specifically, in the coherent DAS platform employed in systems, methods, and structures according to aspects of the present disclosure, four beating products $\zeta_{xx}$, $\zeta_{yy}$, $\zeta_{xy}$, $\zeta_{yx}$ are computed at once in DSP, and all of them are used for fiber strain computation. Parallelized beat-product vectors are then processed at each different location separately to calculate the dynamic fiber strain. A multi-polarization-state (MPSC) combining process then properly weighs and combines the four beat product results to just one $\zeta[n]$.

Figure 3:
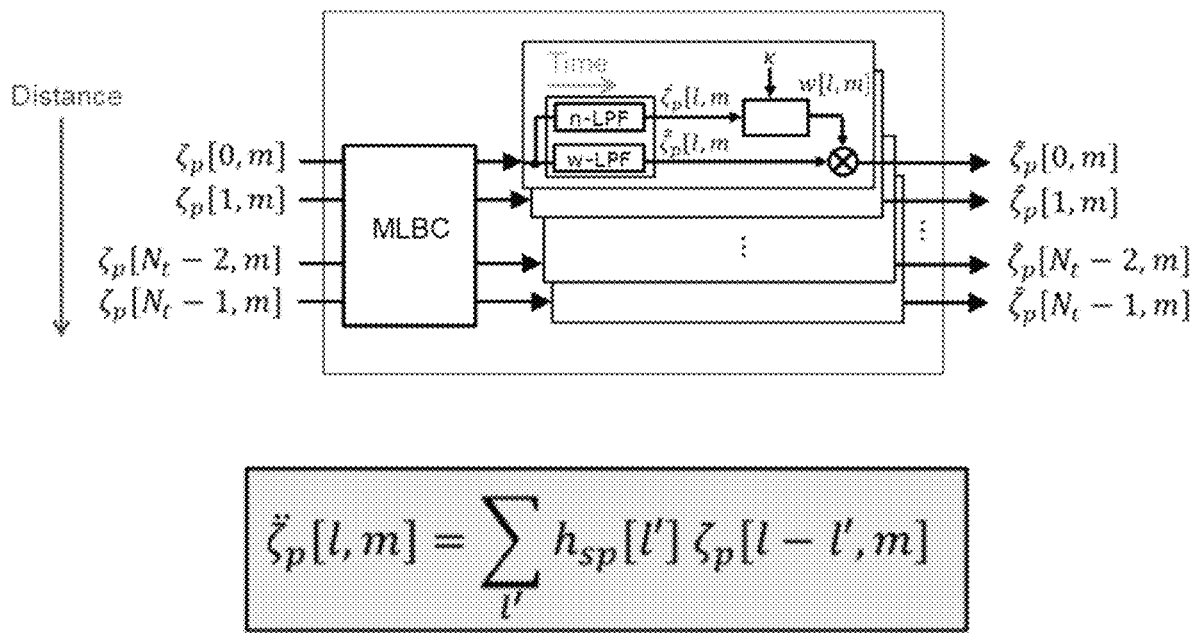
FIG. 3 shows a schematic diagram of an illustrative multi-location beat-term combining (MLBC) process according to aspects of the present disclosure.
Figure 4A:
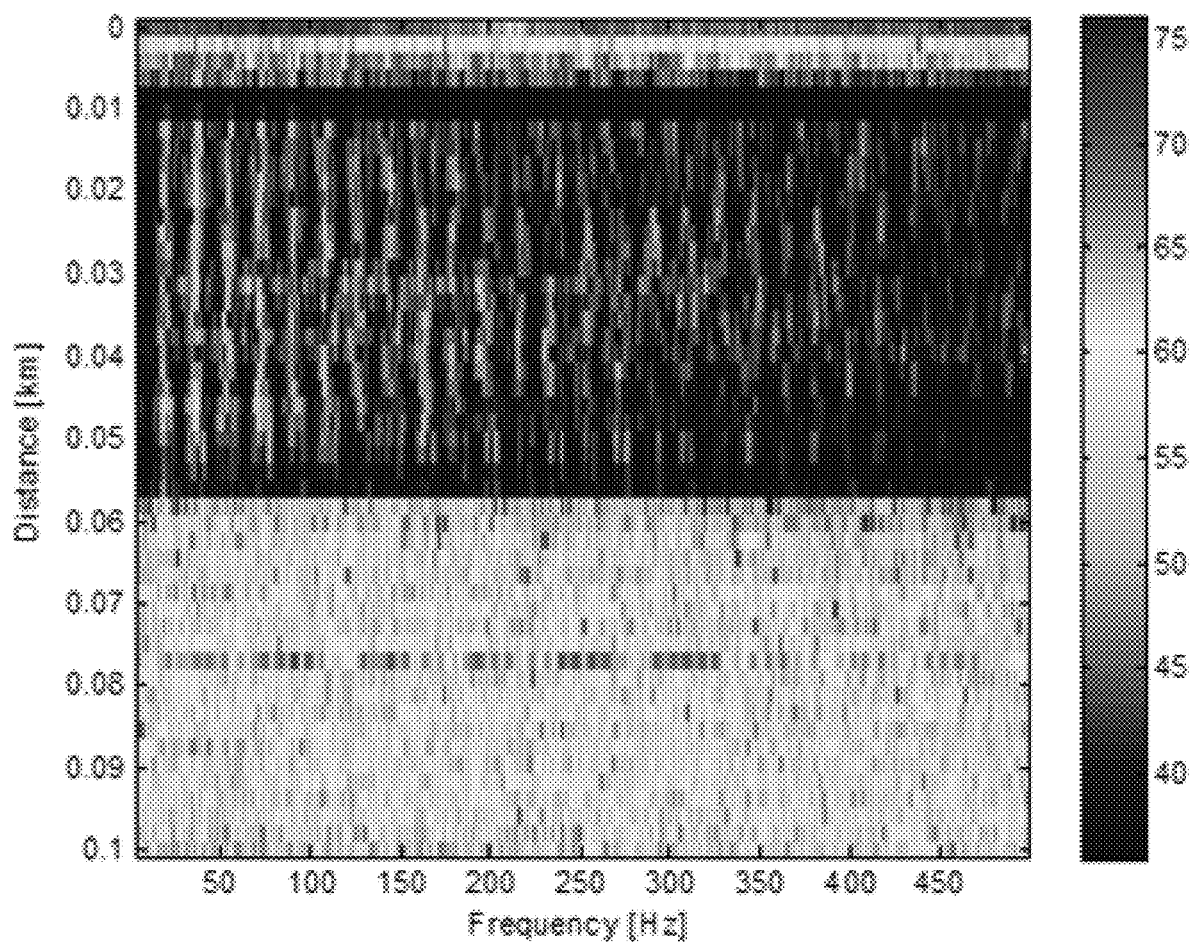
Figure 4B:
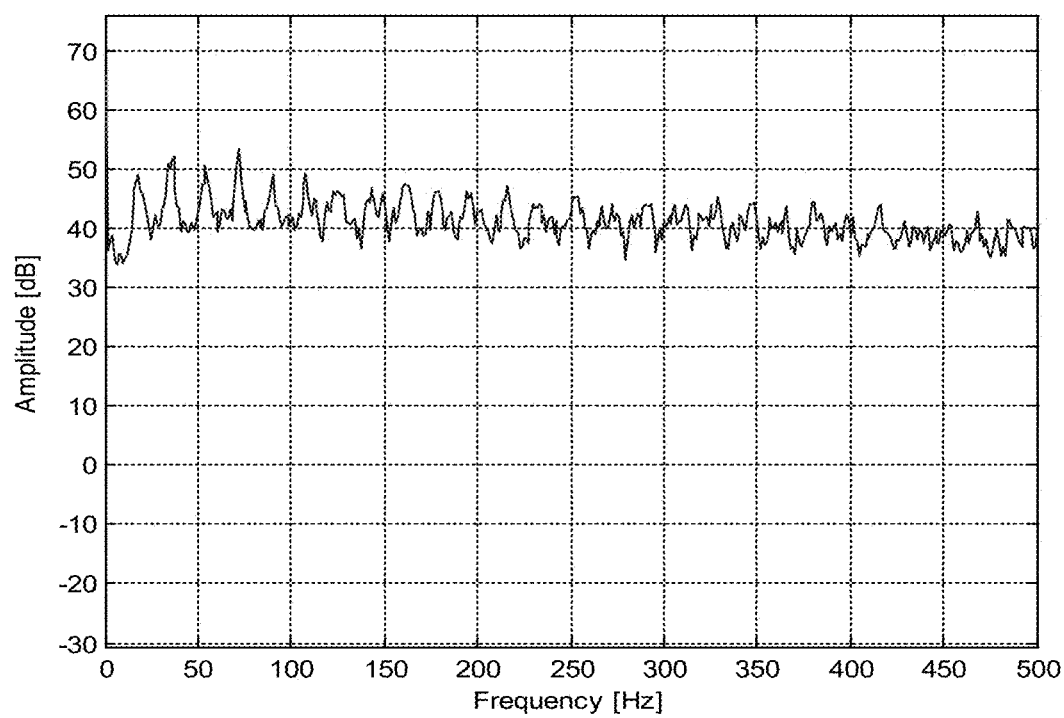
Figure 4C:
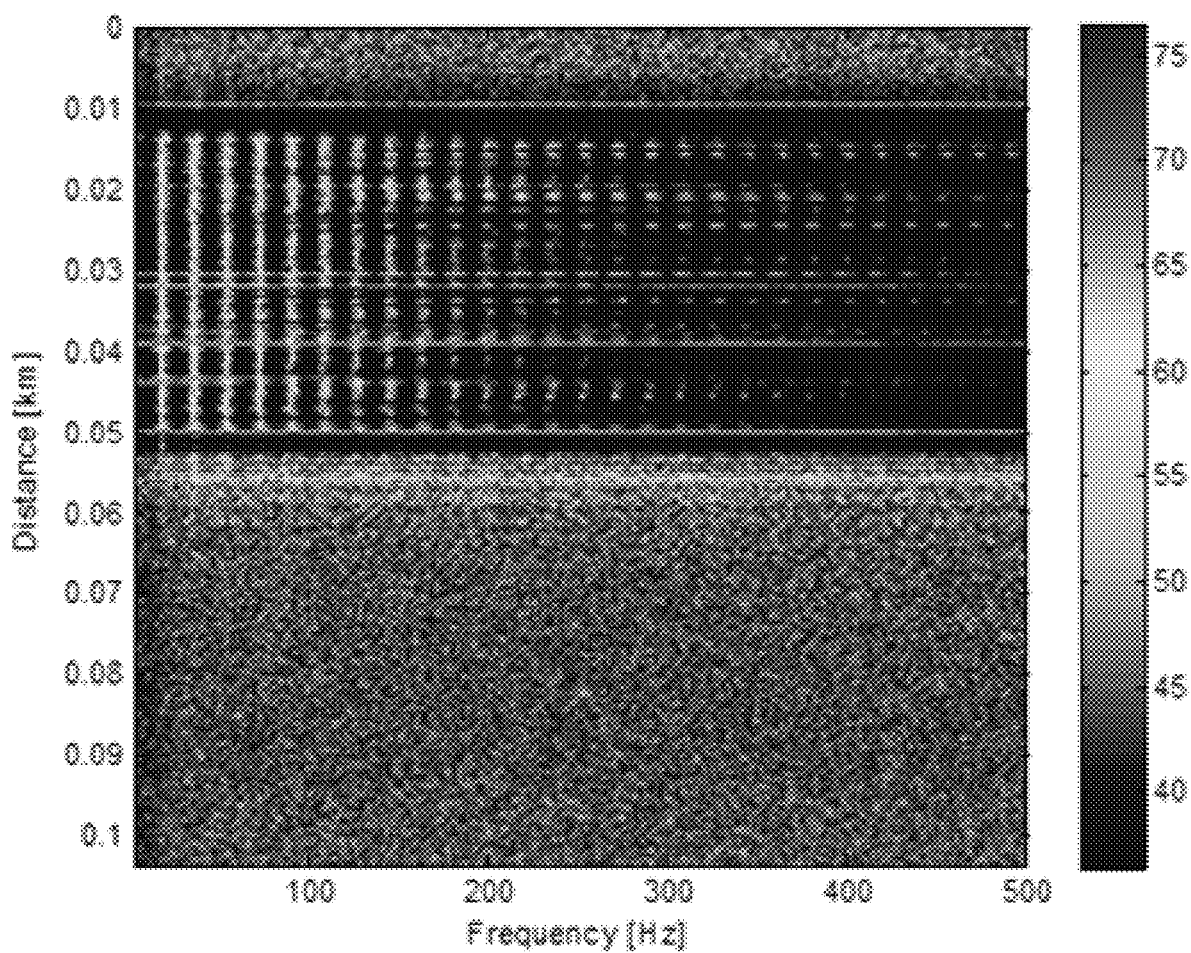
Figure 4D:
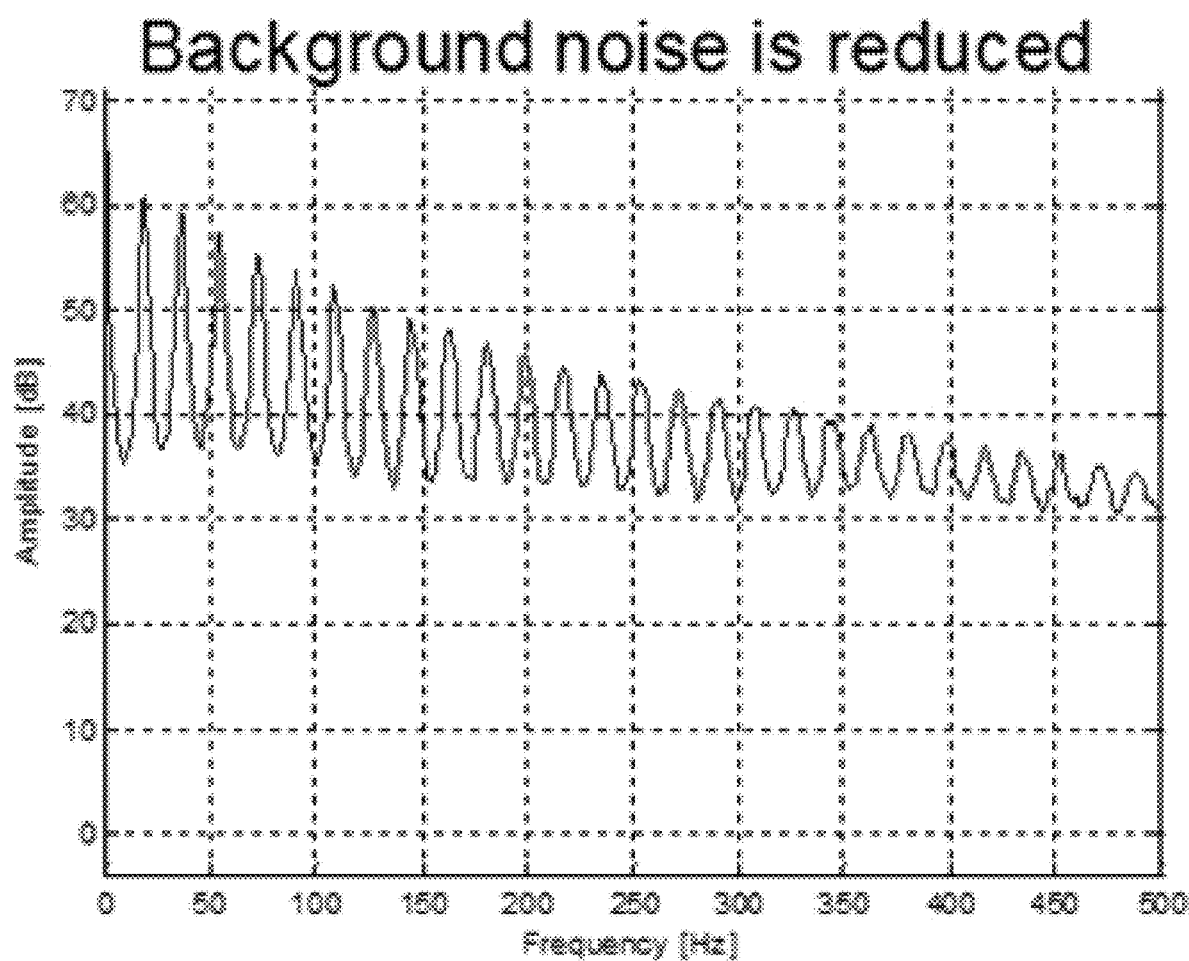

FIG. 3 shows a schematic diagram of an illustrative multi-location beat-term combining (MLBC) process according to aspects of the present disclosure. First a temporal averaging step is done, using a low pass filter $h_{LPF}[m]$, to find the average of each four vectors. Then the complex conjugate of the averaged vector is multiplied with the corresponding vector using inner product before all four products are summed. The inner product multiplication does two function: it first provides weighting on each of the four vector so that the one that has the larger beating values (less faded) will contribute more to the final results; secondly it rotates all four vectors so they all point to the same direction thus they can be added without signal cancellation. After this step, only one complex valued vector $\zeta_p$ will represent the fiber strain signal at location p.

For the same fiber section length, the short pulse DAS system according to aspects of the present disclosure obtains more beating data points due to the higher raw spatial resolution. Due to the high resolution, each of the beating points will experience different Rayleigh fading statistics. These parallel beat-products, parallel computed at each location, are then weighted and combined across the neighboring location. The process, called the multi-location beat-term combining (MLBC), is shown in FIG. 3.

It is the key process to average out the Rayleigh fading effect that exist in the raw data points, while extracting the correlated dynamic strain information across the neighboring locations. Typically, the MPSC step which combines the beating results from different polarization states will align the DC beat vector orientation for every location, and no more vector rotation is required for MLBC. If MPSC step is not performed in the prior step, a temporal averaging on $\zeta_p$ of each location is required to be performed separately using a narrow low pass filter $h_{n\_LPF}[m]$ (time domain). Then the complex conjugate of the averaged vector is multiplied to $\zeta_p$ so that the beating vectors from neighboring locations are aligned to the same direction so they can be combined without signal cancellation. The $h_{sp}[l]$ (spatial domain) in the MLBC is a spatial averaging filter which determines the shape and width of the averaging window across neighboring locations. After MLBC, an optional spatial amplitude equalization step can be applied. It utilizes the narrow low-pass filter $h_{n\_LPF}[m]$ to calculate the weighting factor w[l,m] so additional Rayleigh fluctuations on the measurement results can be equalized across different locations.

In large vibration environments, a DAS system is subject to strong dynamic Rayleigh fading effects, creating distortion and instability in measured phase results. As a proof of principle, we tested DAS performance with various interrogation pulse widths to verify the detected vibration SNR, using a short pulse DAS prototype constructed and configured according to aspects of the present disclosure.

To implement our testing, a mechanical cantilever with 40 m of fiber patch cord wrapped on top was used as the vibration source to simulate large vibration. The mechanical cantilever has a natural frequency of ~18 Hz and was displaced by the same amount ~5-mm initially for every measurement.

FIG. 4(A), FIG. 4(B), FIG. 4(C), and FIG. 4(D) are a series of spectrogram plots illustrating DAS measurement results for: FIG. 4(A), FIG. 4(B)—40 ns pulse width; and FIG. 4(C), FIG. 4(D), 4 ns pulse width, according to aspects of the present disclosure.

On the spectrogram, we can observe the 18-Hz natural frequency and many harmonics in both cases, because the large vibration caused the detected phase to make multiple rotations on the complex domain. However, the spectrogram obtained by 4-ns pulse contains lines that are much sharper compared to that of the 40-ns pulse, allowing it to better resolve the spectral contents of the vibration. After taking a slice from the spectrogram and comparing the vibration amplitude spectra, it is apparent that the source of the blurred frequency resolution in 40-ns pulse case was from the deteriorated vibration SNR due to dynamic Rayleigh fading. With the modified DAS design with narrow pulse width, we can clearly observe the improvement in the vibration SNR.

Figure 5A:
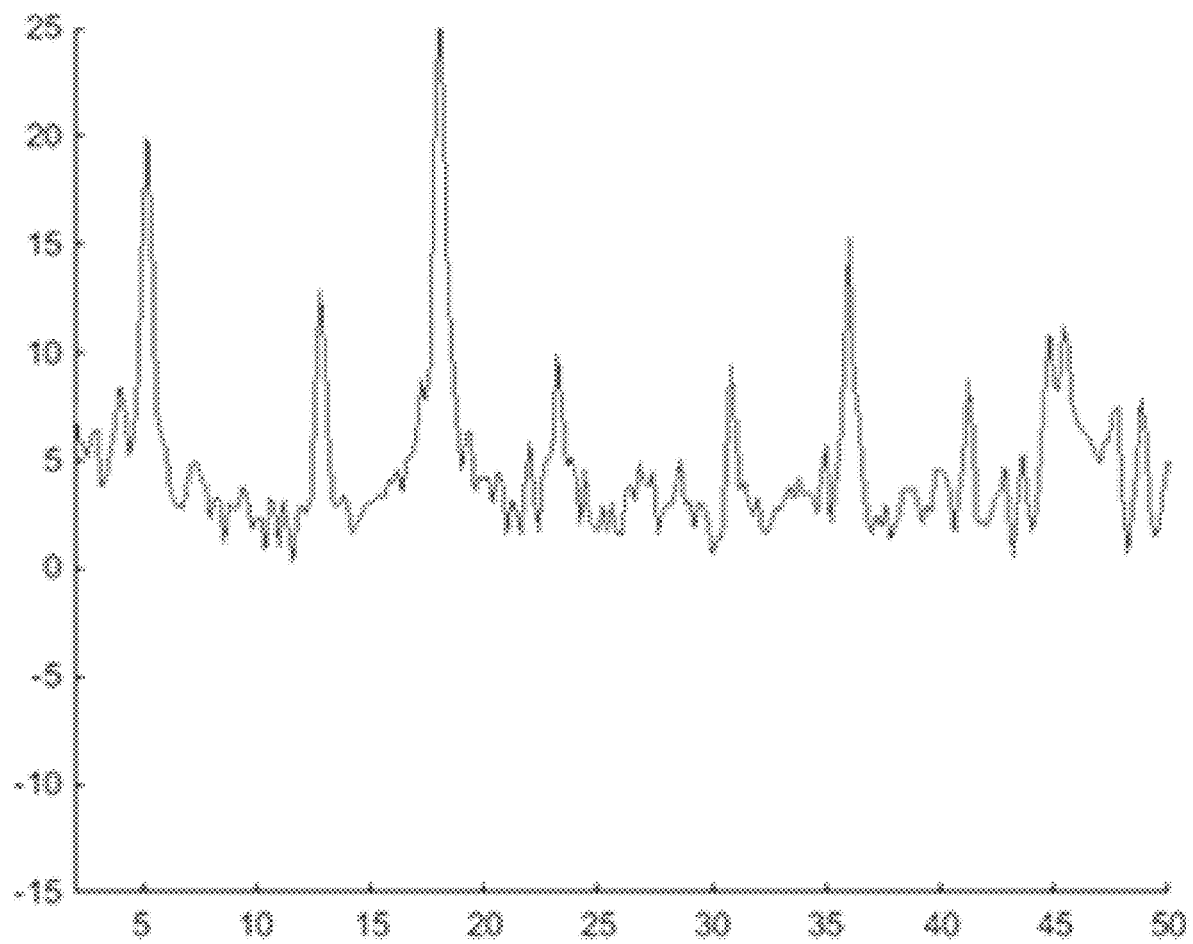
FIG. 5(A) and FIG. 5(B) are a pair of plots illustrating.
Figure 5B:
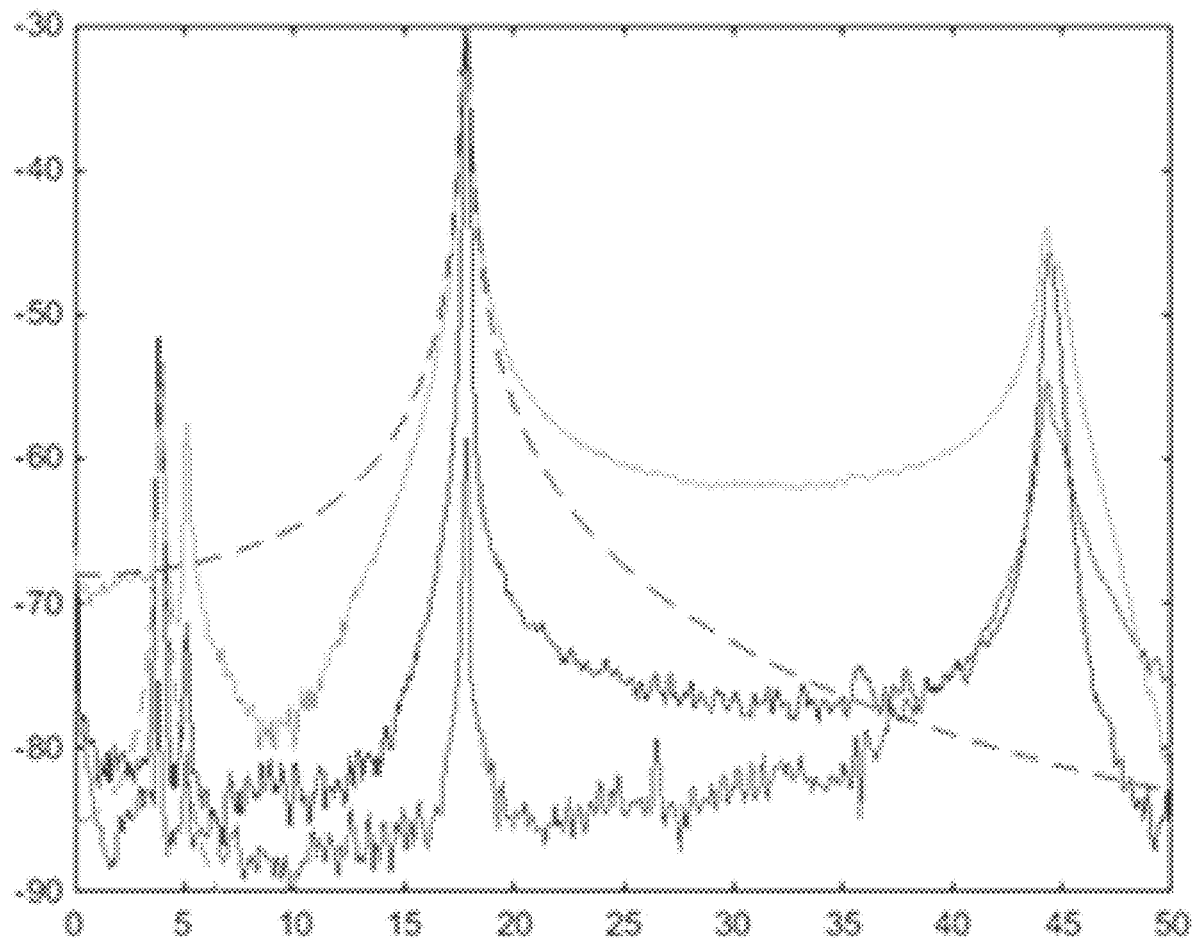

One useful application for short-pulse DAS according to aspects of the present disclosure is the measurement of aerial fiber cables. FIG. 5(A) and FIG. 5(B) are a pair of plots illustrating: FIG. 5(A) DAS measurement results on aerial cable attached to a telephone pole; and FIG. 5(B) 3D accelerometer measurements on the same telephone pole according to aspects of the present disclosure.

As performed, FIG. 5(A) plots the vibration spectrum on a fiber section attached to a telephone pole, obtained using a 4-ns pulse-width DAS, attached to the pole. We observed several frequency peaks corresponding to the natural vibration frequencies of the pole, along with their harmonics. When we compare to the vibration measurements to the results of a 3D accelerometer attached to the pole, we found correlation at the fundamental frequencies of 3.9 Hz and 17.8 Hz. There are other vibration frequencies picked up by the DAS alone which are from the wind-induced aerial cable swing. If the same measurement was performed using a 40-ns pulse-width DAS, we would not be able to observe the frequency peaks due to the much degraded vibration SNR. This is one example demonstrating how our scheme—and systems, methods, and structures according to aspects of the present disclosure may advantageously mitigate Rayleigh fading effect using the narrow interrogation pulse and our new MLBC DSP algorithm.

While we have presented this disclosure using some specific examples, those skilled in the art will recognize that our teachings are not so limited. Accordingly, this disclosure should be only limited by the scope of the claims attached hereto.

The invention claimed is:

1. An improved optical fiber distributed acoustic sensing system comprising:
 a length of optical fiber; and
 an optical interrogator that generates optical pulses, introduces them into the optical fiber and receives Rayleigh reflected signals from the fiber;
 the improved optical fiber sensing system CHARACTERIZED BY:
 a coherent receiver configured to extract information from the Rayleigh reflected signals wherein said short-pulse interrogation optical pulses having a pulse-width <=4 ns;
 a two stage, cascaded pulse modulator;
 the system configured to perform a multi-polarization-state (MPSC) combining process wherein the MPSC process includes four beating products $\zeta_{xx}$, $\zeta_{yy}$, $\zeta_{xy}$, $\zeta_{yx}$ that are computed at once in a digital signal processor (DSP), and all of them are used for fiber strain computation.

2. An improved optical fiber distributed acoustic sensing system comprising:
 a length of optical fiber; and
 an optical interrogator that generates optical pulses, introduces them into the optical fiber and receives Rayleigh reflected signals from the fiber;
 the improved optical fiber sensing system CHARACTERIZED BY:
 a coherent receiver configured to extract information from the Rayleigh reflected signals wherein said short-pulse interrogation optical pulses having a pulse-width <=4 ns;
 a two stage, cascaded pulse modulator;
 the system configured to perform a multi-polarization-state (MPSC) combining process wherein the MPSC process includes four beating products $\zeta_{xx}$, $\zeta_{yy}$, $\zeta_{xy}$, $\zeta_{yx}$ that are computed at once in a digital signal processor (DSP), and all of them are used for fiber strain computation; and
 the four beating products $\zeta_{xx}$, $\zeta_{yy}$, $\zeta_{xy}$, $\zeta_{yx}$ are weighted and combined into a single combined beat product result, $\zeta[n]$.

* * * * *